(12) United States Patent
Briggs et al.

(10) Patent No.: US 7,363,586 B1
(45) Date of Patent: Apr. 22, 2008

(54) COMPONENT LOCALIZATION (75) Inventors: Reeves H. Briggs, Arlington, MA (US); Marek L. Gorecki, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 10/609,281

(22) Filed: Jun. 26, 2003

(51) Int. Cl.
*G06F 13/00* (2006.01)
*G06F 15/00* (2006.01)

(52) U.S. Cl. .................................. 715/736; 715/746

(58) Field of Classification Search ........ 715/763–765, 715/852–853, 736, 746, 740; 709/203, 209
See application file for complete search history.

(56) References Cited

U.S. PATENT DOCUMENTS

| | | |
|---|---|---|
| 5,434,776 A | 7/1995 | Jain |
| 6,252,589 B1 | 6/2001 | Rettig et al. |
| 6,311,151 B1 | 10/2001 | Yamamoto et al. |
| 6,493,735 B1 | 12/2002 | Kumhyr |
| 2002/0046240 A1* | 4/2002 | Graham et al. ............. 709/203 |
| 2002/0156688 A1* | 10/2002 | Horn et al. .................... 705/26 |

\* cited by examiner

*Primary Examiner*—Cao (Kevin) Nguyen
(74) *Attorney, Agent, or Firm*—Lee & Hayes, PLLC (57) ABSTRACT

In an implementation of component localization, control components are maintained that each define a localization format, such as a display format for a section of a display. A locale designation is received and a control component is obtained that corresponds to a locale. Display data is generated that includes the control component in a display format defined by the control component and which corresponds to the designated locale according the defined localization format.

30 Claims, 6 Drawing Sheets

COMPONENT LOCALIZATION

TECHNICAL FIELD

This invention relates to component localization and localized user interface display.

BACKGROUND

As computing technologies continue to expand to new regions throughout the World, technical innovators such as Web site designers and program developers face the ever-increasing task of having to localize content and program applications for different countries, regions, cultures, languages, user groups, and the many combinations thereof that describe a locale. Localization involves conforming an application, content, display information, and the like to appear to have been developed as a "local" product or service that conforms to the culture of a particular locale or region. For example, features such as language, date display format, time display format, money values and denominations, user identifications and naming formats, and the like are all details of localization that are considered when developing or conforming products and services for a particular locale.

Conventional applications are encoded, or otherwise developed and programmed, to incorporate one of many hard-coded localization options when the application is installed for use. For example, when a user first installs a new operating system, the installation process obtains locale information from the user, typically in the form of the user's language and country. Thereafter, the operating system will execute applications according to the designated language and country format. This type of localization conformance requires complex logic and lengthy code with extensive variations and exceptions to accommodate the many possible combinations of different countries, regions, cultures, languages, and user groups. As computing technologies continue to expand, it becomes increasingly difficult to encode and provide the many localization permutations needed to accommodate all of the possible locales and regions.

SUMMARY

Component localization is described herein.

In an implementation, control components are maintained that each define a localization format, such as a display format for a section of a display. A locale designation is received and a control component is obtained that corresponds to a locale. Display data is generated that includes the control component in a display format defined by the control component and which corresponds to the designated locale according the defined localization format.

BRIEF DESCRIPTION OF THE DRAWINGS

The same numbers are used throughout the drawings to reference like features and components.

DETAILED DESCRIPTION

Component localization is described in which a control component can be instantiated with a client application to define a localization format that corresponds to a designated locale or computer environment. Any localization details that describe or define a locale, such as a country, region, culture, language, user group, an environment, and/or computer environment can be combined to establish a localization format. A control component can be instantiated with a Web browser application, for example, to define a localized display format for a section of a Web page display. In another example implementation of component localization, a control component can be instantiated to define the latest Web browser application version that is supported by a computer operating system. Portable component instantiation, or "hot-swapping" of code components, can be implemented with component localization, as described herein.

Component localization utilizes a fall-back, or degradation, process to obtain a control component based on a particular locale. Initially, a localized control component that is the closest match to a designated locale is obtained. If, however, a localized control component is not available, any number of secondary control components that degrade from a specific to a more general localization can be obtained. Further, if a secondary control component is not available or cannot be obtained, a generalized control component is available as a default control component that corresponds to the designated locale.

Figure 1:
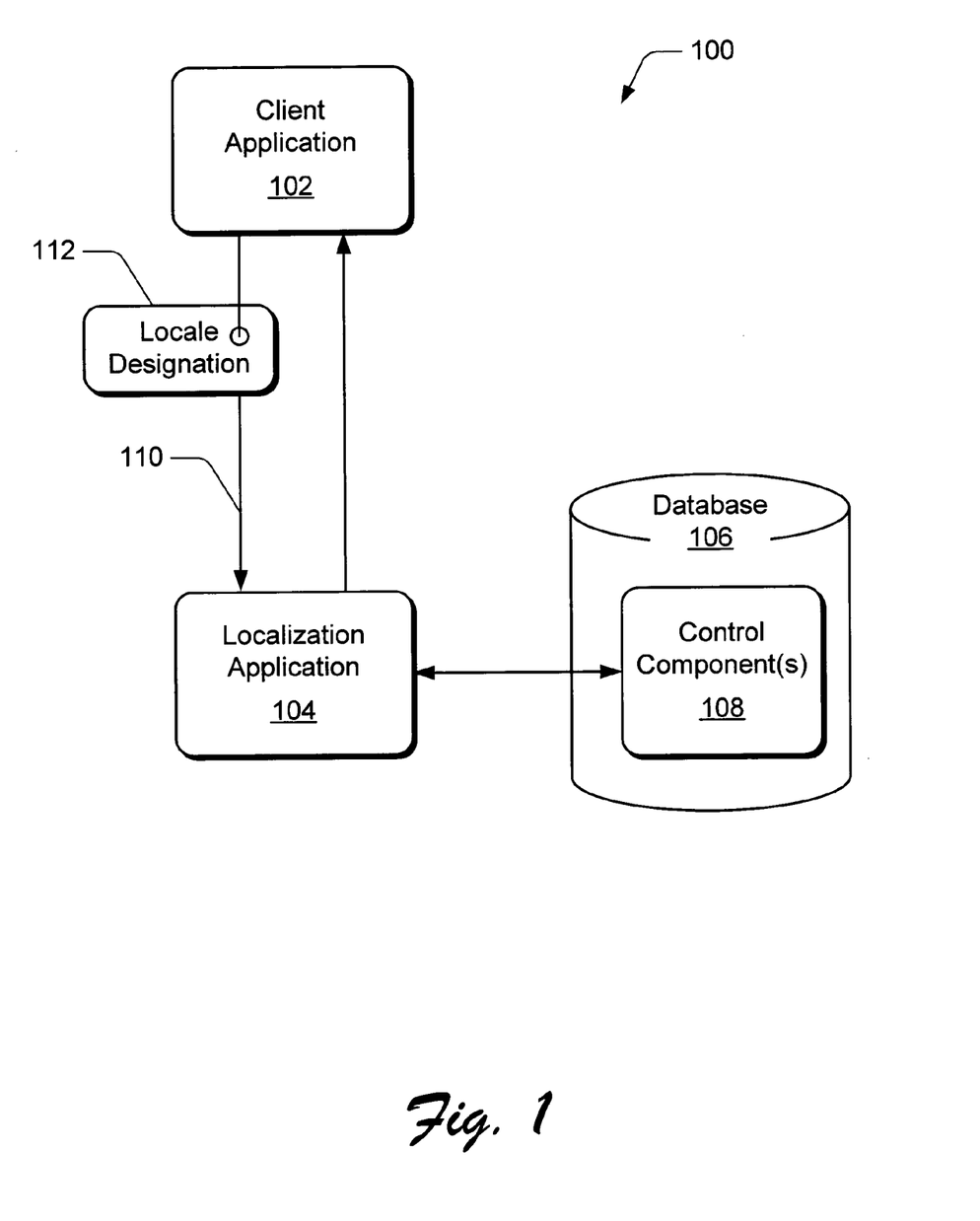
FIG. 1 illustrates various components of an exemplary component localization system.

FIG. 1 illustrates components of an exemplary component localization system 100 which includes a client application 102, a localization application 104, and a database 106 that maintains control component(s) 108. A control component 108 is software-based file that is maintained as a module of computer executable instructions. In an implementation of component localization, a control component 108 corresponds to a locale and defines a localization format which relates or identifies a language and country combination for the locale.

For example, four different languages are predominately spoken in the country of Switzerland (i.e., German, French, Italian, and Romansch). When client application 102 executes on a computing device, a display generated by the client application 102 should present user information in a language and format familiar to a particular user. For example, a German-speaking user in Switzerland would expect to view a display generated by client application 102 in the German language. Further, the display should be presented in a display format that is also familiar to the user. For example, the time of day can be displayed in a twenty-four hour time format, or in a twelve-hour time format, as applicable in a particular country.

The client application 102 communicates a request 110 for a control component 108 to the localization application 104 where the request 110 includes a locale designation 112 that designates a particular locale. The locale designation may include such information as user preference data, user computer logon information, application specific data, known characteristics, client application version information, operating system information, and/or any combination thereof that can be determined to identify a locale or computer environment by the localization application 104. A locale refers to any country, region, culture, language, user group, environment, and/or any combination of localization factors thereof. Further, a user group may define any combination of the localization factors, or may define any other type of discernable group or category of computer users or computing systems. A locale may also refer to a computer environment and include localization factors such as computer device configuration information, client application information, operating system information, and the like.

In another implementation of component localization, a control component 108 corresponds to a computer environment and defines a localization format which relates or identifies a client application version, or a component of the client application, with operating system requirements, application integration details, and/or computer component configuration. For example, a user of a computer system may upgrade or install a newer operating system (or even a different operating system) on the computer. When the user next logs on to the Internet, for example, a Web browser (e.g., client application 102) communicates updated information for the new and/or different operating system along with Web browser application information (e.g., as locale designation 112) to the localization application 104. The localization application 104 can then obtain and return control component(s) 108 that most closely match the new and/or different client application 102, such as a newer, supported version of a Web page which can be generated for display.

The component localization system 100 can be implemented in any form of application component instantiation system where an application requests and receives a component for instantiation while the application is processing and/or is being executed. The system 100 can be implemented for application versions, data migration, componentization, and for any other type of component instantiation.

Each control component 108 is localized according to a designated locale or computer environment that includes any localization factors. For example, a particular control component 108 can define a localization format for a language and country combination, a language and geographic area combination, a language and user group combination, a user group, an environment, a computer environment, and/or any other localization format. Further, a control component 108 can be designated as a localized control component that defines any localization format, as a secondary control component that may define a language format, or as a generalized control component that defines a localization format corresponding to a designated locale or computer environment.

When the localization application 104 receives the request 110 that includes the locale designation 112, the localization application 104 obtains a control component 108 that corresponds to the locale or computer environment designated by the locale designation 112. The localization application 104 then communicates the control component 108 to the client application 102 for instantiation with the client application.

The localization application 104 includes degradation logic that returns a secondary or default control component 108 if a corresponding localized control component is not available. For example, localization application 104 first attempts to obtain a localized control component that defines a localization format for a language and country combination. If the localized control component is not available, localization application 104 attempts to obtain a secondary control component that may define a localization format for a language that corresponds to the designated locale. If the secondary control component is also not available, localization application 104 obtains a generalized control component that defines a default localization format for the locale.

The component localization system 100 can be implemented with any number and combination of differing components as further described below with reference to the exemplary computing systems, devices, and components shown in FIG. 6. For example, the database 106 can be implemented as one or more of the different memory components described with reference to FIG. 6. Further, although client application 102 and localization application 104 are each illustrated and described as single application programs, each of the applications 102 and 104 can be implemented as several component applications distributed to each perform one or more functions in the component localization system 100.

Figure 2:
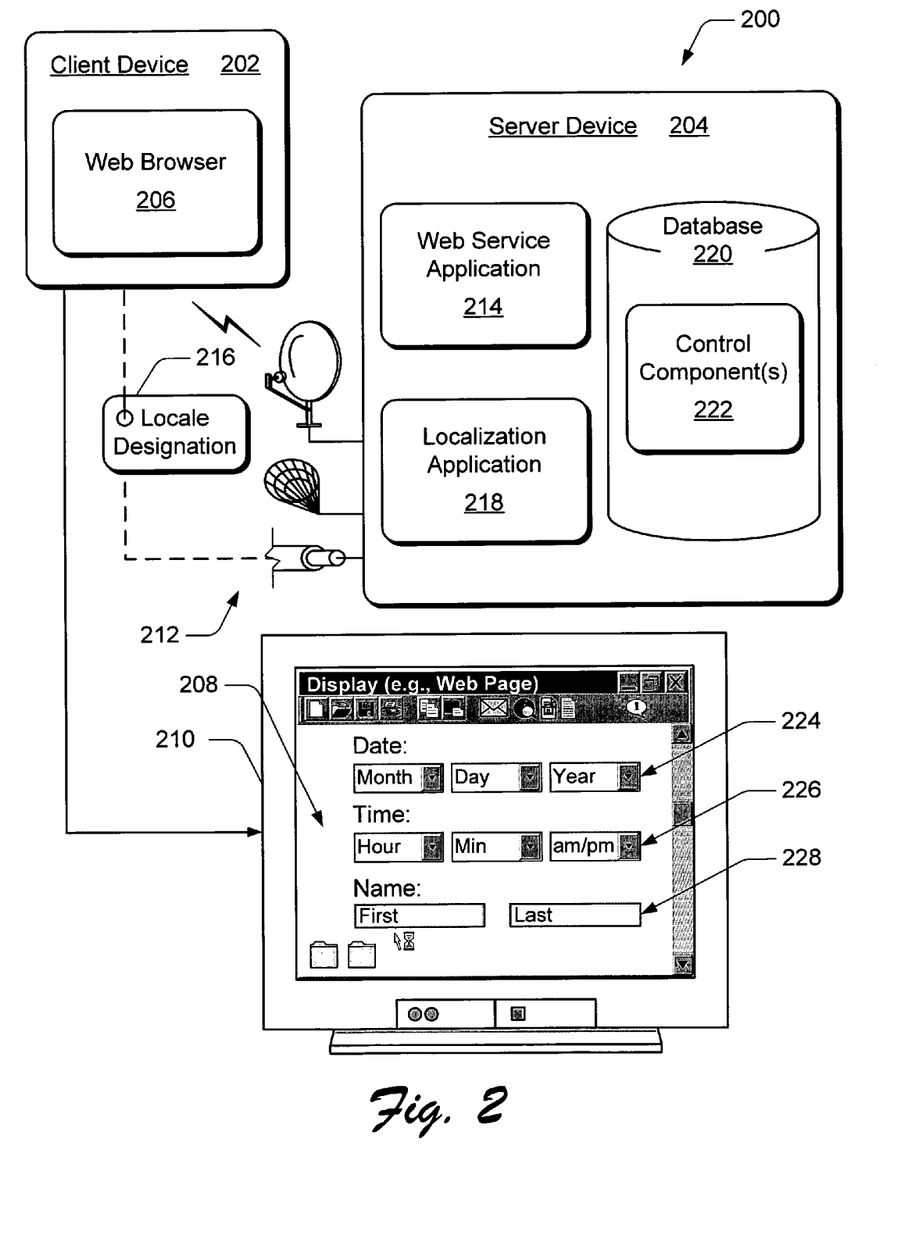
FIG. 2 illustrates an exemplary implementation of a component localization system.

FIG. 2 illustrates an exemplary implementation of a component localization system 200 which includes a client device 202 and a server device 204. The client device 202 includes a Web browser 206 that requests a Web page from the server device 204 and generates Web page 208 for display on display device 210. The client device 202 communicates with the server device 204 via various transmission media 212, such as satellite transmission, radio frequency transmission, cable transmission, and/or via any number of other transmission media.

The server device 204 includes a Web service application 214 that receives a request for service from the Web browser 206. The request for service can be a request for display data, for example, and includes a locale designation 216 that designates a locale. The server device 204 also includes a localization application 218 and a database 220 that maintains control component(s) 222. The Web service application 214 communicates the received locale designation 216 to the localization application 218.

Based on the locale designation 216 which can include such information as user preference data, user computer logon information, application specific data, known characteristics, and/or any combination thereof, the localization application 218 obtains a control component 222 that defines a localization format corresponding to the locale designated by the locale designation 216. The Web service application 214 generates display data for the Web page 208 which includes the control component 222 in a localization format defined by the control component. The Web service application 214 then communicates the display data for the Web page 208 to the Web browser 206 via the transmission media 212.

The Web page 208 can be generated to include any number of different control component variations, such as a localization format for language, a date display format 224, a time display format 226, user name formats 228, and the like. The control components can also include localization formats for text entry boxes, drop-down lists, and any other user interface selectable controls.

The component localization system 200 can be implemented with any number and combination of differing components as further described below with reference to the exemplary computing systems, devices, and components shown in FIG. 6. Although the Web service application 214 and the localization application 218 are each illustrated and described as single application programs, each of the applications 214 and 218 can be implemented as several component applications distributed to each perform one or more functions in a component localization system. Further, the Web service application 214 and the localization application 218 can be implemented together as a single application program.

Figure 3A:
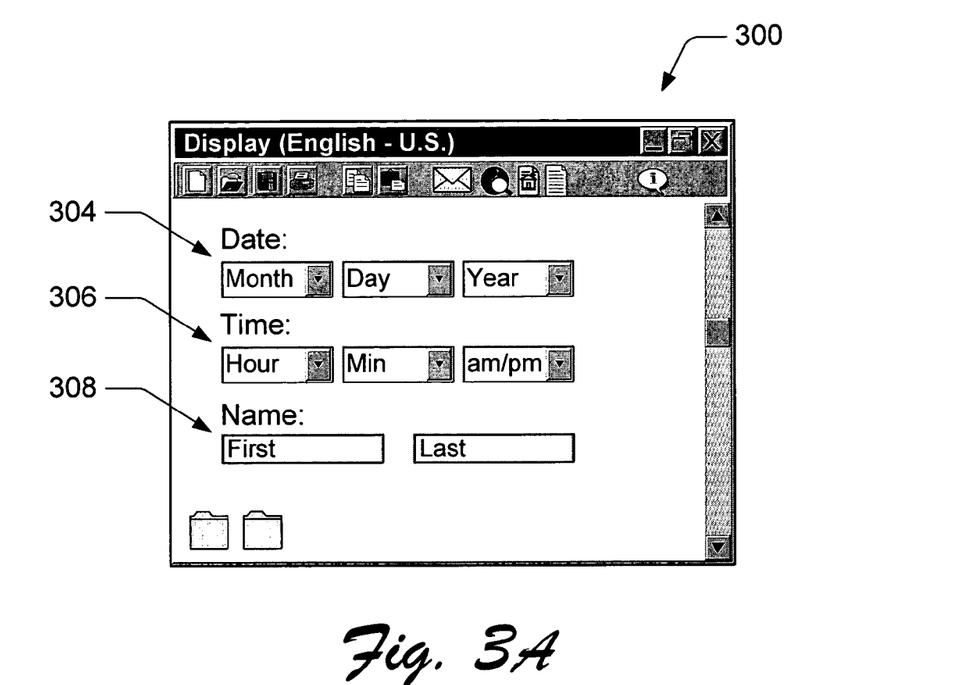
FIGS. 3A and 3B illustrate exemplary displays with localized control components.
Figure 3B:
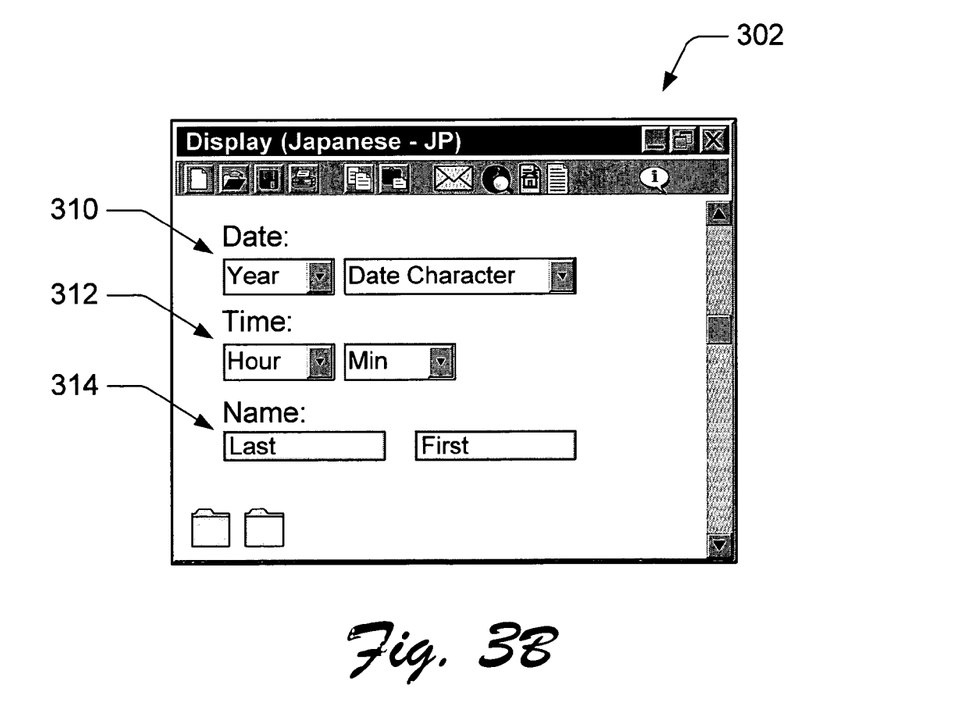

FIGS. 3A and 3B illustrate exemplary displays 300 and 302, respectively, with localized control components, such as may be generated by the component localization system 200 shown in FIG. 2. FIG. 3A illustrates a display 300 having a localization format corresponding to English and the United States as a language and country format combination. FIG. 3B illustrates a display 302 having a localization format corresponding to Japanese and Japan which is also a language and country format combination (the text of display 302 is shown in English for the purpose of this example, but in practice, would be displayed in Japanese).

Display 300 (FIG. 3A) includes date control components 304, time control components 306, and name control components 308 all displayed in the English-U.S. localization format. The date 304 is displayed in a month-day-year format, the time 306 is displayed in an hour-minute-a.m/p.m. twelve-hour time format, and the name 308 is displayed in a first name first and last name last format as is customary in the United States.

Display 302 (FIG. 3B) includes date control components 310, time control components 312, and name control components 314 all displayed in the Japanese-JP localization format. The date 310 is displayed in a year-date character format, the time 306 is displayed in an hour-minute twenty-four-hour time format, and the name 308 is displayed in a first name last and last name first format as is customary in Japan.

It should be noted that the control components can be implemented in a recursive structure such that each control component can contain, or otherwise include, other control components to further define a localization format. In addition to the extensibility of localization with control components, user interface layout and functionality can be controlled with the control components. For example, a control component can define whether to set the focus on the first or last name entry box when name control components are included in a display.

Figure 4:
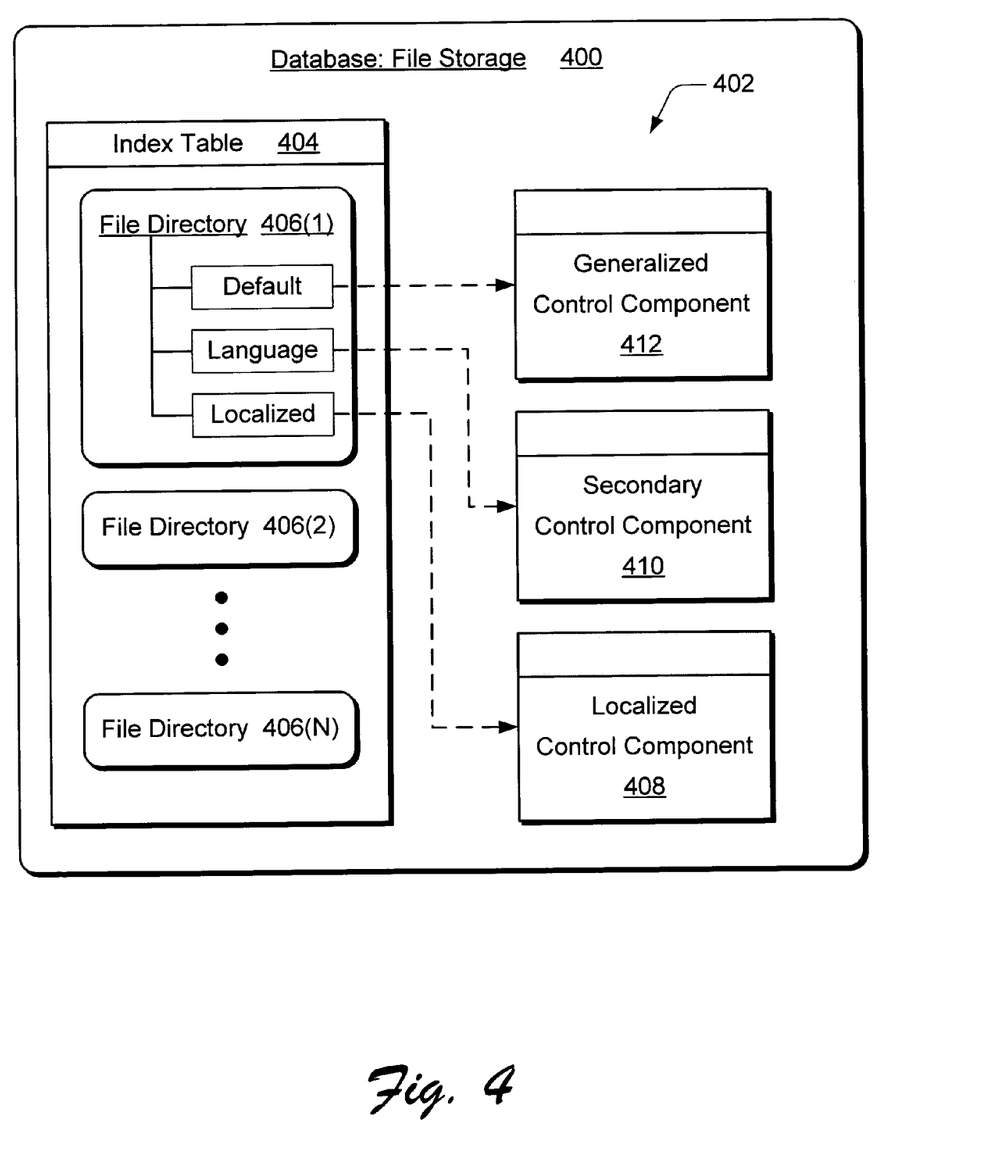
FIG. 4 illustrates an exemplary database implementation for component localization.

FIG. 4 illustrates an exemplary implementation of a database 400 which is a file storage for control components 402 and an index table 404 which can be implemented as a hash table, database table, text file, file system directory structure, or as any number of other different control component reference structures. Index table 404 includes any number of file directories 406(1), 406(2), . . . , 406(N) that reference the control components 402. For example, file directory 406(1) includes a reference to a localized control component 408, a secondary control component 410, and a generalized (default) control component 412.

The control components 402 can be maintained in database 400 in any format, such as the RFC1766 source specification format: <languagecode2>-<country/regioncode2>, where "languagecode2" is a lowercase two-letter code derived from ISO 639-1 and "country/regioncode2" is an uppercase two-letter code derived from ISO 3166. The control components can include a primary language which is defined as the "languagecode2" component.

As described above in one example with reference to FIG. 1, a localization application receives a locale designation that designates a locale and attempts to obtain the localized control component 408 that defines a localization format for a language and country combination that corresponds to the designated locale. If the localized control component 408 is not available from the associated file directory 406, the localization application attempts to obtain the secondary control component 410 that may define a localization format for a language that corresponds to the designated locale. If the secondary control component 410 is also not available from the file directory 406, the localization application obtains the generalized control component 412 that defines a default localization format for the designated locale.

The reference organization of the control components 402, as referenced by the file directories 406, determines which control component is obtained by a localization application for a given locale. For example, file directory 406(1) may correspond to a Spanish and United States language and country combination which is defined by the localized control component 408. If the localized control component 408 was not available from file directory 406(1), the localization application can obtain the secondary control component 410 which defines the Spanish language. Thus, a Spanish-speaking user in the United States would still be presented with a display that is in the Spanish language. However, if the secondary control component 410 is also not available from the file directory 406(1), the localization application can obtain the generalized control component 412 which may define a default English and United States language and country combination.

Although file directory 406(1) includes only the three references to the control components 402, any number of control components 402 can be associated with a particular file directory 406 and maintained with database 400. Further, a file directory 406 can reference any number of secondary control components that each define a different localization format for a particular locale or computer environment. The degradation process then attempts to obtain the next closest match to a particular locale from any number of secondary control components that define a secondary localization format after determining that a localized control component is not available.

In a computer environment, for example, a localized control component may define an English—U.S.—Web browser—Version#—Operating System localization format combination. A secondary control component may then define an English—Web browser—Version#—Operating System localization format combination. Additionally, another secondary control may define just the Web browser—Version#—Operating System localization format combination. Any number of secondary control components each having any number of localization format levels can be defined to correspond to a particular locale or computer environment.

Methods for component localization may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
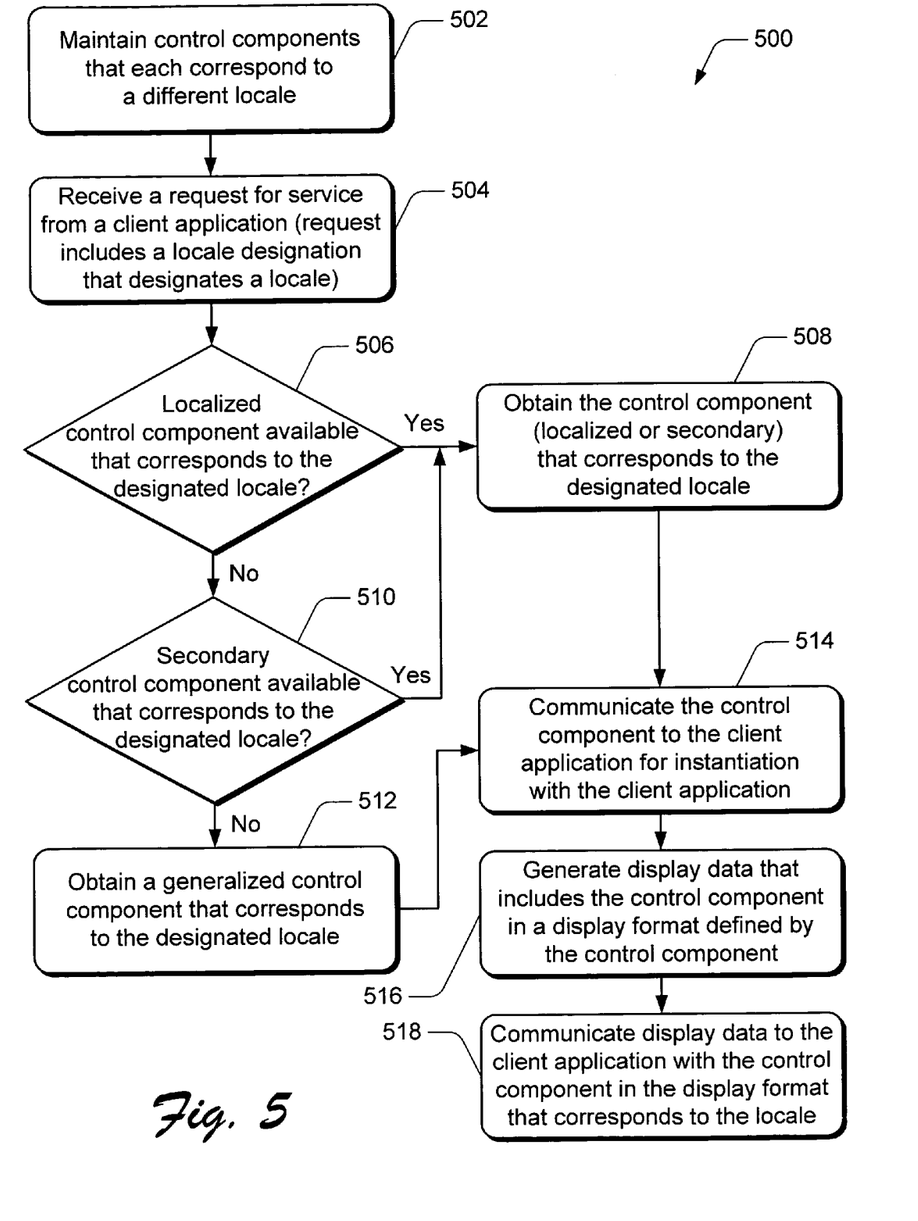
FIG. 5 is a flow diagram that illustrates an exemplary method for component localization.

FIG. 5 illustrates a method 500 for a component localization system. The order in which the method is described is not intended to be construed as a limitation, and any number of the described method blocks can be combined in any order to implement the method. Furthermore, the method can be implemented in any suitable hardware, software, firmware, or combination thereof.

At block 502, control components that each correspond to a different locale are maintained. For example, database 106 (FIG. 1) can be implemented as one or more memory components that maintain control components 108. At block 504, a request for service is received from a client application where the request for service includes a locale designation that designates a locale (which may include a computer environment in this example method 500). For example, client application 102 (FIG. 1) communicates a request 110 to localization application 104 and the request includes locale designation 112.

The request for service can be for display data, such as described with reference to FIG. 2 and the exemplary component localization system 200. The received locale designation can include, for example, user preference data and/or user logon information that identifies the locale. Further, the request for service can be related to a computer environment, such as described with reference to FIG. 1 and the exemplary component localization system 100. The received locale designation can include, for example, client application version information and operating system information that identifies the computer environment.

At block 506, a determination is made as to whether a localized control component that corresponds to the designated locale is available. In one implementation of component localization, a localized control component defines a localization format for a language and country combination that corresponds to the designated locale, or may be a control component that defines a language and geographic area combination or a language and user group combination that corresponds to the designated locale. A localized control component may also define a user group and/or an environment that corresponds to the designated locale. In another implementation of component localization, a localized control component defines a localization application that corresponds to a designated computer environment.

If a localized control component is available (i.e., "yes" from block 506), then the localized control component that corresponds to the designated locale is obtained at block 508. If a localized control component is not available (i.e., "no" from block 506), then a determination is made as to whether a secondary control component that corresponds to the designated locale is available at block 510. A secondary control component defines a localization format that corresponds to the designated locale, such as a language display format, for example.

If a secondary control component is available (i.e., "yes" from block 510), then the secondary control component that corresponds to the designated locale is obtained at block 508. If a secondary control component is not available (i.e., "no" from block 510), then a generalized control component that corresponds to the designated locale is obtained at block 512. A generalized control component is a default control component that defines a generalized localization format which corresponds to the designated locale. Further, a default control component can include any form of a localized control component, a secondary control component, a language control component, or any other control component that defines a localization format, or combination thereof.

At block 514, the control component (obtained at either block 508 or block 512) is communicated to the client application for instantiation with the client application. For example, localization application 104 (FIG. 1) obtains a control component 108 from the database 106 and communicates the control component to client application 102.

At blocks 516 and 518, in the alternative or in addition to block 514, display data is generated for a display that includes the control component in a localization format defined by the control component (block 516). At block 518, the display data is communicated to the client application with the control component in a display format that corresponds to the designated locale and the localization format.

Figure 6:
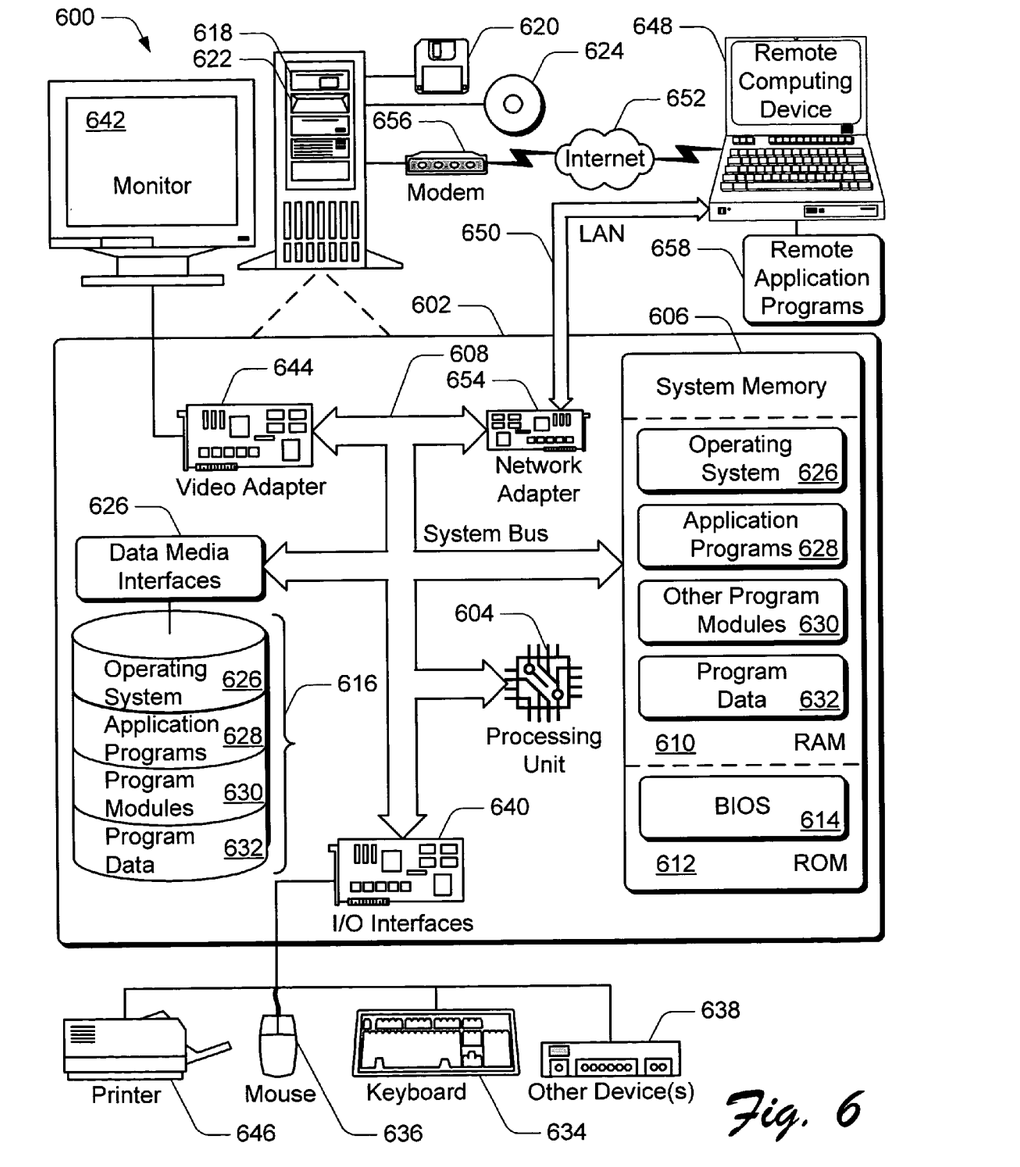
FIG. 6 illustrates a diagram of exemplary computing systems, devices, and components in an environment that component localization can be implemented.

FIG. 6 illustrates an example of a computing environment 600 within which the component localization systems and methods, as well as the computer, network, and system architectures described herein, can be either fully or partially implemented. Exemplary computing environment 600 is only one example of a computing system and is not intended to suggest any limitation as to the scope of use or functionality of the network and system architectures. Neither should the computing environment 600 be interpreted as having any dependency or requirement relating to any one or combination of components illustrated in the exemplary computing environment 600.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, by are not limited to, one or more processors 604 (e.g., any of microprocessors, controllers, and the like), a system memory 606, and a system bus 608 that couples various system components including the processor 604 to the system memory 606. The one or more processors 604 process various computer-executable instructions to control the operation of computing device 602 and to communicate with other electronic and computing devices.

The system bus 608 represents any number of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computing environment 600 typically includes a variety of computer-readable media. Such media can be any available media that is accessible by computing device 602 and includes both volatile and non-volatile media, removable and non-removable media. The system memory 606 includes computer-readable media in the form of volatile memory, such as random access memory (RAM) 610, and/or non-volatile memory, such as read only memory (ROM) 612. A basic input/output system (BIOS) 614, containing the basic routines that help to transfer information between elements within computing device 602, such as during start-up, is stored in ROM 612. RAM 610 typically contains data and/or program modules that are immediately accessible to and/or presently operated on by the processing unit 604.

Computing device 602 can also include other removable/non-removable, volatile/non-volatile computer storage media. By way of example, a hard disk drive 616 is included for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD, or any other type of optical media. The hard disk drive 616, magnetic disk drive 618, and optical disk drive 622 are each connected to the system bus 608 by one or more data media interfaces 626. Alternatively, the hard disk drive 616, magnetic disk drive 618, and optical disk drive 622 can be connected to the system bus 608 by a SCSI interface (not shown).

The disk drives and their associated computer-readable media provide non-volatile storage of computer-readable instructions, data structures, program modules, and other data for computing device 602. Although the example illustrates a hard disk 616, a removable magnetic disk 620, and a removable optical disk 624, it is to be appreciated that other types of computer-readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may include an embodiment of the systems and methods for a test instantiation system.

Computing device 602 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 602 via input devices such as a keyboard 634 and a pointing device 636 (e.g., a "mouse"). Other input devices 638 (not shown specifically) may include a microphone, joystick, game pad, controller, satellite dish, serial port, scanner, and/or the like. These and other input devices are connected to the processing unit 604 via input/output interfaces 640 that are coupled to the system bus 608, but may be connected by other interface and bus structures, such as a parallel port, game port, and/or a universal serial bus (USB).

A monitor 642 or other type of display device can also be connected to the system bus 608 via an interface, such as a video adapter 644. In addition to the monitor 642, other output peripheral devices can include components such as speakers (not shown) and a printer 646 which can be connected to computing device 602 via the input/output interfaces 640.

Computing device 602 can operate in a networked environment using logical connections to one or more remote computers, such as a remote computing device 648. By way of example, the remote computing device 648 can be a personal computer, portable computer, a server, a router, a network computer, a peer device or other common network node, and the like. The remote computing device 648 is illustrated as a portable computer that can include many or all of the elements and features described herein relative to computing device 602.

Logical connections between computing device 602 and the remote computer 648 are depicted as a local area network (LAN) 650 and a general wide area network (WAN) 652. Such networking environments are commonplace in offices, enterprise-wide computer networks, intranets, and the Internet. When implemented in a LAN networking environment, the computing device 602 is connected to a local network 650 via a network interface or adapter 654. When implemented in a WAN networking environment, the computing device 602 typically includes a modem 656 or other means for establishing communications over the wide network 652. The modem 656, which can be internal or external to computing device 602, can be connected to the system bus 608 via the input/output interfaces 640 or other appropriate mechanisms. It is to be appreciated that the illustrated network connections are exemplary and that other means of establishing communication link(s) between the computing devices 602 and 648 can be employed.

In a networked environment, such as that illustrated with computing environment 600, program modules depicted relative to the computing device 602, or portions thereof, may be stored in a remote memory storage device. By way of example, remote application programs 658 reside on a memory device of remote computing device 648. For purposes of illustration, application programs and other executable program components, such as the operating system, are illustrated herein as discrete blocks, although it is recognized that such programs and components reside at various times in different storage components of the computer system 602, and are executed by the data processor(s) of the computer.

Although component localization has been described in language specific to structural features and/or methods, it is to be understood that the subject of the appended claims is not necessarily limited to the specific features or methods described. Rather, the specific features and methods are disclosed as exemplary implementations of the claimed invention.

The invention claimed is:

1. A component localization system, comprising:
   one or more memory components configured to maintain control components that each define a localization format for a section of a display;
   a localization application configured to obtain a control component that corresponds to a locale wherein the localization application is further configured to receive a locale designation that designates the locale, and wherein the control component is a secondary control component which defines the localization format for a language that corresponds to the locale; and a server application configured to generate display data for the display which includes the control component in a localization format defined by the control component.

2. A component localization system as recited in claim 1, wherein the localization application is further configured to obtain the control component which defines the localization format as a language and country combination that corresponds to the locale.

3. A component localization system as recited in claim 1, wherein the localization application is farther configured to obtain the control component which defines the localization format as a language and geographic area combination that corresponds to the locale.

4. A component localization system as recited in claim 1, wherein the localization application is further configured to obtain the control component which defines the localization format as a language and user group combination that corresponds to the locale.

5. A component localization system as recited in claim 1, wherein the localization application is further configured to obtain the control component which defines the localization format for a user group that corresponds to the locale.

6. A component localization system as recited in claim 1, wherein the localization application is further configured to obtain the control component which defines the localization format for an environment that corresponds to the locale.

7. A component localization system as recited in claim 1, wherein the localization application is further configured to receive a locale designation that designates the locale, and wherein the control component is a localized control component which defines the localization format as a language and country combination that corresponds to the locale.

8. A component localization system as recited in claim 1, wherein the localization application is farther configured to receive a locale designation that designates the locale, and wherein the control component is a localized control component which defines the localization format as a language and user group combination that corresponds to the locale.

9. A component localization system as recited in claim 1, wherein the localization application is further configured to receive a locale designation that designates the locale, and wherein the control component is a generalized control component which defines the localization format that corresponds to the locale.

10. A component localization system as recited in claim 1, wherein the server application is further configured to receive a request for service from a client application, and wherein the request for service includes a locale designation that designates the locale.

11. A component localization system as recited in claim 1, wherein the server application is further configured to:
   receive a request for the display data from a client application, the request including a locale designation that designates the locale; and
   communicate the display data to the client application with the control component in a display format that corresponds to the locale and the localization format.

12. A component localization system as recited in claim 1, wherein the server application is further configured to:
   receive a request for the display data from a client application, the request including user preference data that identifies the locale; and
   communicate the display data to the client application with the control component in a display format that corresponds to the locale and the localization format.

13. A component localization system as recited in claim 1, wherein the server application is farther configured to:
   receive a request for the display data from a client application, the request including user logon information that identifies the locale; and
   communicate the display data to the client application with the control component in a display format that corresponds to the locale and the localization format.

14. A component localization system as recited in claim 1, wherein the server application is further configured to:
   receive a request for additional display data from a client application, the request including a locale designation that designates a second locale;
   generate the additional display data which includes a second control component having a second localization format, the second control component replacing the control component in the display; and
   communicate the additional display data to the client application with the second control component in a display format that corresponds to the second locale and the second localization format.

15. A server device comprising the component localization system as recited in claim 1, and wherein the server device comprises a Web server that includes the localization application and the server application.

16. A component localization system, comprising:
   one or more memory components configured to maintain control components that each correspond to a different locale; and
   a localization application configured to receive a locale designation that designates a locale, the localization application being further configured to obtain a control component from the one or more memory components where the control component defines a localization format for the designated locale; wherein the control component is at least one of a localized control component, a secondary control component, and a generalized control component, and wherein the localization application is further configured to:
   obtain the localized control component if the localized control component is available;
   obtain the secondary control component if the localized control component is not available; and
   obtain the generalized control component if the localized control component and the secondary control component are not available.

17. A component localization system as recited in claim 16, wherein the localization application is further configured to obtain the control component which defines a language and country combination that corresponds to the designated locale.

18. A component localization system as recited in claim 16, wherein the localization application is further configured to obtain the control component which defines a language and geographic area combination that corresponds to the designated locale.

19. A component localization system as recited in claim 16, wherein the localization application is further configured to obtain the control component which defines a language and user group combination that corresponds to the designated locale.

20. A component localization system as recited in claim 16, wherein the localization application is further configured to obtain the control component which defines a user group that corresponds to the designated locale.

21. A component localization system as recited in claim 16, wherein the localization application is further configured to obtain the control component which defines an environment that corresponds to the designated locale.

22. A component localization system as recited in claim 16, wherein the localization application is further configured to obtain the control component which defines a computer environment that corresponds to the designated locale.

23. A component localization system as recited in claim 16, wherein the control component is at least one of a localized control component, a secondary control component, and a generalized control component, and wherein the localization application is further configured to:
  obtain the localized control component which defines a language and country combination that corresponds to the locale;
  obtain the secondary control component which defines a language that corresponds to the locale if the localized control component is not available; and
  obtain the generalized control component if the localized control component and the secondary control component are not available.

24. A component localization system as recited in claim 16, wherein the localization application is further configured to receive a request for the control component from a client application, and wherein the request for the control component includes the locale designation that designates the locale.

25. A component localization system as recited in claim 16, wherein the localization application is further configured to:
  receive a request for the control component from a client application, the request including the locale designation that designates the locale; and
  communicate the control component to the client application for instantiation with the client application.

26. A component localization system, comprising:
  one or more memory components configured to maintain control components that each correspond to a different computer environment; and
  a localization application configured to receive a locale designation that designates a computer environment, the localization application being further configured to obtain a control component from the one or more memory components where the control component defines a localization format for the designated computer environment; wherein the control component is at least one of a localized control component, a secondary control component, and a generalized control component each of which corresponds to the designated computer environment.

27. A component localization system as recited in claim 26, wherein the localization application is further configured to obtain the control component which defines a client application configuration that corresponds to the designated computer environment.

28. A component localization system as recited in claim 26, wherein the localization application is farther configured to obtain the control component which defines a language and client application configuration combination that corresponds to the designated computer environment.

29. A component localization system as recited in claim 26, wherein the localization application is further configured to receive a request for the control component from a client application, and wherein the request for the control component includes the locale designation that designates the computer environment.

30. A component localization system as recited in claim 26, wherein the localization application is further configured to:
  receive a request for the control component from a client application, the request including the locale designation that designates the computer environment; and
  communicate the control component to the client application for instantiation with the client application.

\* \* \* \* \*

UNITED STATES PATENT AND TRADEMARK OFFICE
CERTIFICATE OF CORRECTION

| | | |
|---|---|---|
| PATENT NO. | : 7,363,586 B1 | Page 1 of 1 |
| APPLICATION NO. | : 10/609281 | |
| DATED | : April 22, 2008 | |
| INVENTOR(S) | : Reeves H. Briggs et al. | |

It is certified that error appears in the above-identified patent and that said Letters Patent is hereby corrected as shown below:

In column 11, line 10, in Claim 3, delete "farther" and insert -- further --, therefor.

In column 11, line 34, in Claim 8, delete "farther" and insert -- further --, therefor.

In column 11, line 67, in Claim 13, delete "farther" and insert -- further --, therefor.

In column 14, line 17, in Claim 28, delete "farther" and insert -- further --, therefor.

Signed and Sealed this
Twelfth Day of July, 2011

David J. Kappos
*Director of the United States Patent and Trademark Office*